United States Patent [19]

Gould

[11] Patent Number: 4,817,656

[45] Date of Patent: Apr. 4, 1989

[54] MULTI-PORT DISTRIBUTION VALVE WITH GEAR DRIVEN ROTARY DISTRIBUTION CYLINDERS

[75] Inventor: Charles M. Gould, Glendale, Ariz.

[73] Assignee: Shasta Industries, Inc., Phoenix, Ariz.

[21] Appl. No.: 162,586

[22] Filed: Mar. 1, 1988

[51] Int. Cl.$^4$ .............................................. F16K 31/16
[52] U.S. Cl. ........................................ 137/2; 137/119; 137/624.14; 137/627
[58] Field of Search ................... 137/119, 624.14, 627, 137/2

[56] References Cited

U.S. PATENT DOCUMENTS

| | | | |
|---|---|---|---|
| 4,086,933 | 5/1978 | Pansini | 137/119 |
| 4,313,455 | 2/1982 | Pitman | 137/119 |
| 4,523,606 | 6/1985 | Gould | 137/119 |
| 4,570,663 | 2/1986 | Gould | 137/119 |

Primary Examiner—Robert G. Nilson
Attorney, Agent, or Firm—Cahill, Sutton & Thomas

[57] ABSTRACT

A fluid distribution apparatus includes an impeller-driven gear reduction mechanism and a plurality of outlet valves controlled in response to the gear reduction mechanism. Each valve includes a hollow stationary cylinder with an open top and an open bottom in fluid communication with a respective outlet port. Each stationary cylinder includes a side port. Each valve also includes a hollow rotating cylinder positioned inside the stationary cylinder and having a closed top connected to a valve drive gear driven by the gear reduction mechanism. Each rotary cylinder has an open bottom that communicates with a respective outlet port of the fluid distribution apparatus. Each rotary cylinder also includes an inlet port that overlaps the inlet port of the corresponding stationary cylinder during a portion of a 360 degree rotation of the rotary cylinder.

8 Claims, 3 Drawing Sheets

MULTI-PORT DISTRIBUTION VALVE WITH GEAR DRIVEN ROTARY DISTRIBUTION CYLINDERS

BACKGROUND OF THE INVENTION

The invention relates to fluid distribution valves of the type which receive pressurized liquid into a closed chamber via an inlet port and sequentially open and then close each of a plurality of outlet ports of the closed chamber, and more particularly to an improved distribution valve that produces very little pressure drop from the inlet opening to a presently opened outlet port.

Multiple outlet fluid distribution valves that receive fluid under high pressure through an inlet port and distribute the fluid through sequential outlet ports are commonly used in self-cleaning swimming pool systems. In such systems, swimming pool water is pumped at high pressure (typically about 20 to 40 pounds per square inch) into the inlet port of the distribution valve. The outlet ports are coupled by lengths of PVC pipe to spaced cleaning heads that are installed in the bottom of the swimming pool and which eject rotary jets of high pressure water along the pool bottom to effectively sweep circular areas around each cleaning head. The state-of-the-art is believed to be best exemplified by commonly assigned U.S. Pat. No. 4,523,606 (Gould et al.), June 18, 1985 and U.S. Pat. No. 4,570,663 (Gould et al.), Feb. 18, 1986, both of which are incorporated herein by reference. Although the structure and technique of U.S. Pat. No. 4,570,663 represents a substantial improvement in solving the problem of oscillatory movement of valve balls onto and off of their seats as a result of sudden reversals of momentum of fluid in long lines, the structure described requires a considerable amount of torque to be applied to the cam that sequentially lifts the valve balls to open the successive ports. Any technique that would reduce the stresses on the filter/cleaning system and the gears would be desirable.

Accordingly, despite the progress made in developing a low cost, highly reliable multi-port distribution valve that meets the needs of the art of providing self-cleaning swimming pool systems, there remains a need for further improvements to solve the above-mentioned problems.

SUMMARY OF THE INVENTION

Accordingly, it is an object of the invention to provide an improved fluid distribution valve which succesively opens a plurality of outlet ports with minimum torque on the internal impeller driven gears.

It is another object of the invention to provide an improved multi-port fluid distribution valve that provides minimum variation in the inlet port pressure during operation and avoids sudden momentum changes in either the inlet or multiple outlet lines.

It is another object of the invention to provide an improved fluid distribution valve which operates effectively with low head pressure.

It is another object of the invention to provide a fluid distribution valve that reduces stresses and increases the life of a fluid system in which the valve is installed.

Briefly described, and in accordance with one embodiment thereof, the invention provides a fluid distribution apparatus having an inlet port receiving pressurized fluid and a plurality out outlet ports, the inlet port supplying pressurized fluid to an interior chamber of a housing include communication with the outlet ports when corresponding outlet valves are open. A rotary impeller driven by fluid from the inlet port drives a gear reduction assembly in the interior chamber. Each of the outlet port valves includes a hollow stationary cylinder having an open top and a bottom opening into a respective one of the outlet ports, each stationary cylinder having a fluid inlet in its side wall, a hollow rotary cylinder rotatably disposed in the corresponding stationary cylinder, the rotary cylinder having a fluid inlet in its side wall that is alignable with the fluid inlet of the stationary cylinder during a portion of the 360 degree rotation of the rotary cylinder, and a drive gear rotating the rotary cylinder in response to the gear reduction mechanism. When inlet ports of the stationary cylinder and rotary cylinder overlap, fluid flows from the interior chamber through the overlapping inlet ports into a corresponding outlet port. The widths of the inlet ports of the stationary and rotary cylinders are selected such that a minimum total overlapping area of all of the outlet port valves at any time always exceeds a selected value so that pressure drop across the fluid distribution apparatus is low at all times.

DETAILED DESCRIPTION OF THE PREFERRED EMBODIMENT OF THE INVENTION

Figure 1:
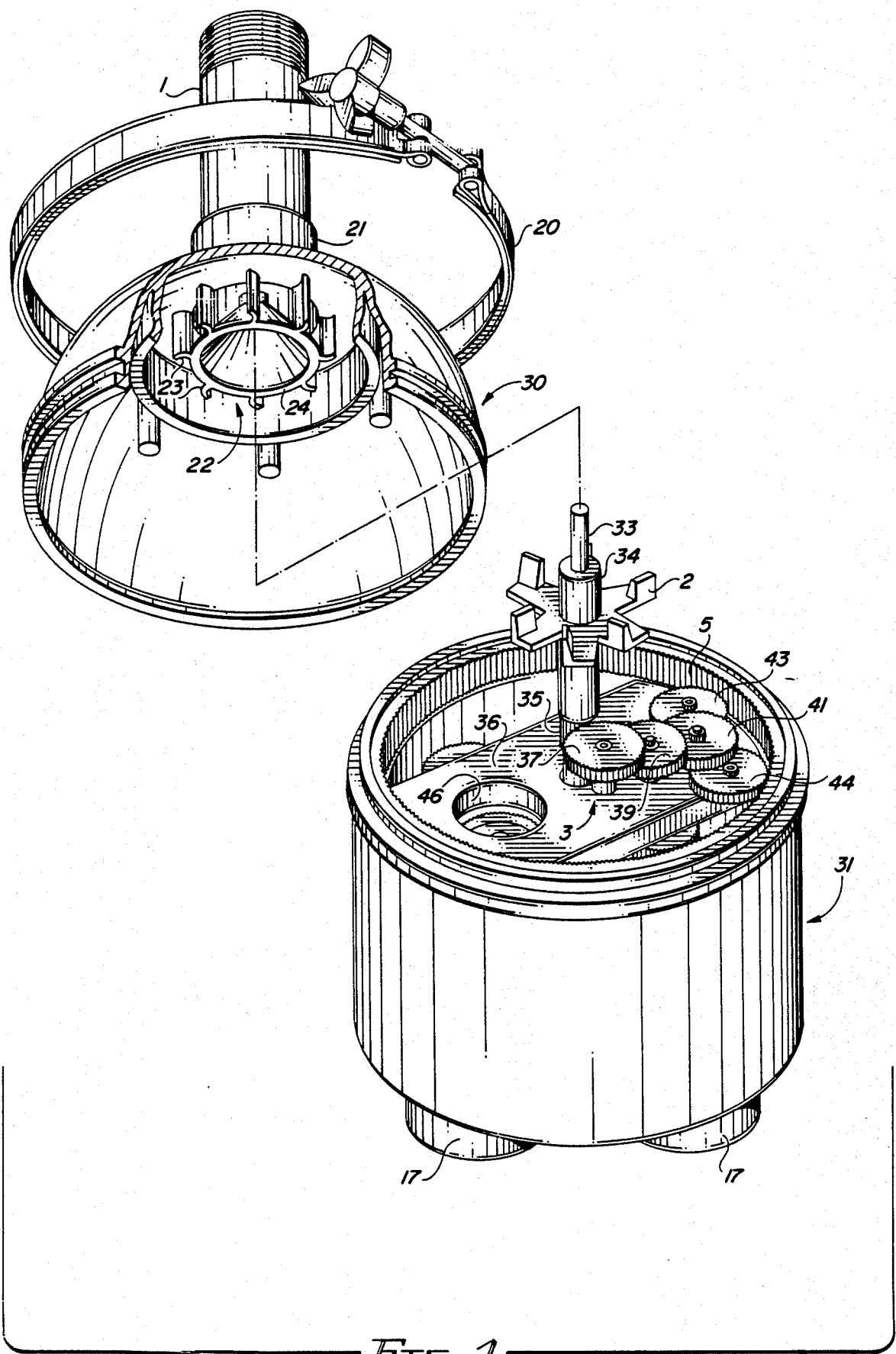
FIG. 1 is an exploded perspective view of the fluid valve of the present invention.

Referring now to the drawings, the fluid distribution valve of FIG. 1 includes a housing having an upper dome-shaped section 30 and a lower cylindrical section 31. Upper section 30 and lower section 31 normally are connected and sealed together by clamp 20, with a suitable 0-ring to provide the seal. At the upper section 30 is an inlet port 21 having an inlet tube 1 for receiving pressurized fluid such as high pressure water from the outlet of a swimming pool filter. Lower section 31 includes five (or any other suitable number) outlet ports 17 disposed on its lower surface for connection to five outlet tubes, which may be connected to different pool cleaning heads disposed in the bottom of a swimming pool. (Of course, the fluid distribution valve may have more or less than five outlet ports.)

As described in more detail in above-referenced U.S. Pat. Nos. 4,523,606 and 4,570,663, a plurality of diversion baffles 23 are attached to the peak inner surface of upper section 30 and to an inner cone 24. Cone 24 diverts high pressure water from inlet port 1 uniformly outward against the vertical baffles 33 which then deflect equal portions of the inlet water against the star-shaped protrusions and vertical veins of impeller 2, as indicated by arrows 50 in FIG. 2. Impeller 2 is attached to a vertical sleeve 34 that rotates about a vertical shaft 33 attached to the bottom surface 28 of lower section 31.

Figure 2:
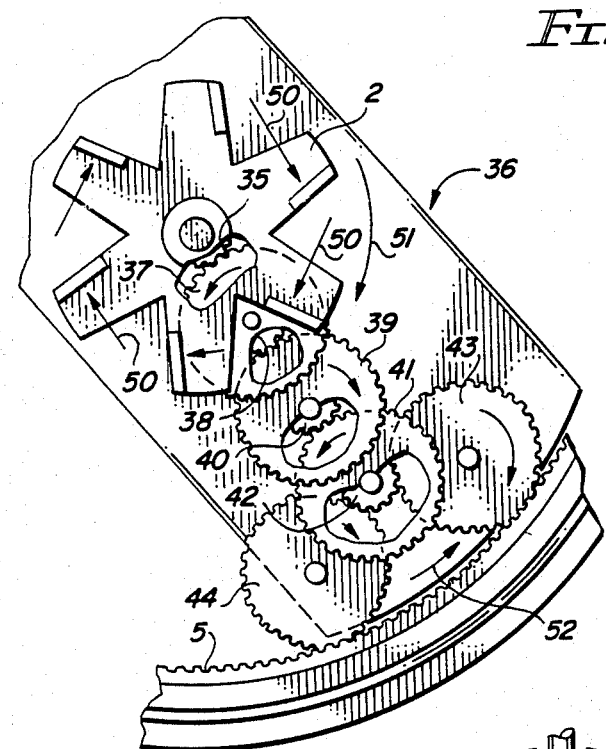
FIG. 2 is a partial top view of the internal gear reduction system of the fluid distribution valve of FIG. 1.
Figure 4:
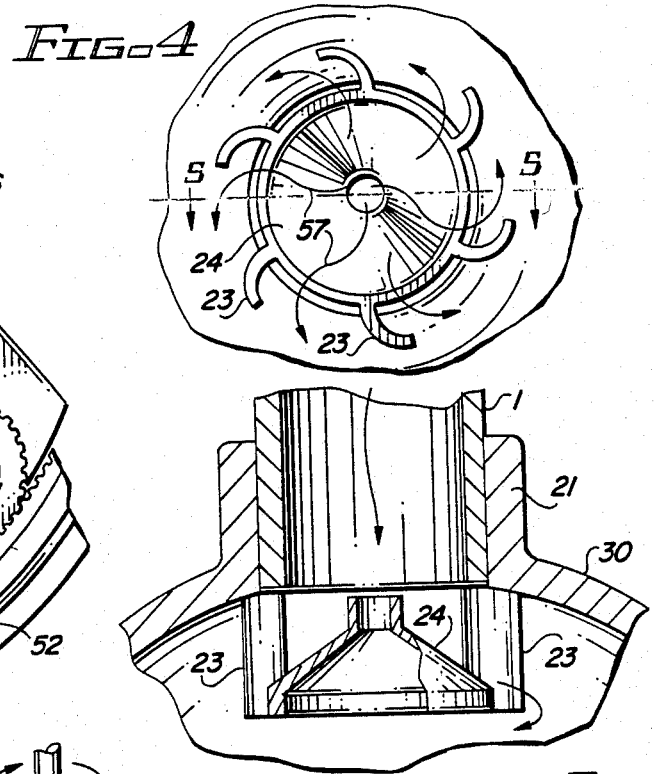
FIG. 4 is a bottom view of diversion baffles contained in the upper section shown in FIG. 1.
Figure 5:
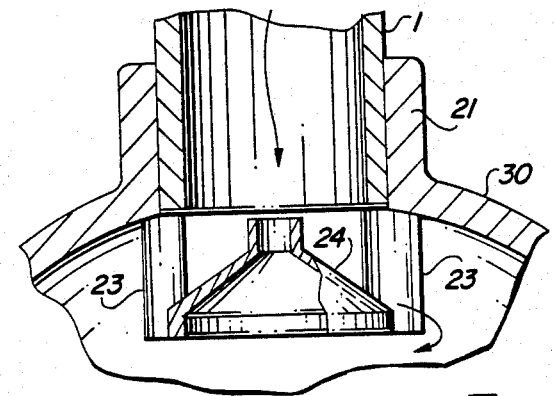
FIG. 5 is a section view taken along section line 5—5 of FIG. 4.

In FIGS. 4 and 5, arrows 57 generally indicate how the upper surface of the cone 24 and the deflecting veins 33 deflect the incoming water so that it effectively engages the vertical veins of impeller 2 and the bottom horizontal star-shaped surface of impeller 2 to provide very high torque with very little pressure drop, as described in more detail in the above-referenced patents. A drive gear 35 attached to the bottom of sleeve bearing 34 drives large gear 37 and a concentric small gear 38. Sleeve bearing 34 rotates on vertical shaft 33. Gear 38 overdrives a large gear 39 and a concentric small gear 40. Small gear 40 drives a large gear 41 and a concentric small gear 42. Small gear 42 drives large gears 43 and 44, the teeth of which engage an inner planetary gear 5 that is attached to the inner upper surface of lower section 31. The gears 37-44 all rotate on pins that are rigidly supported by rotary base 36. The directions of rotation of the various gears are indicated in FIG. 2, so that rotation of impeller 2 in the direction or arrow 51 results in rotation of rotary base 36 in the direction of arrow 52 (FIG. 2).

Figure 3:
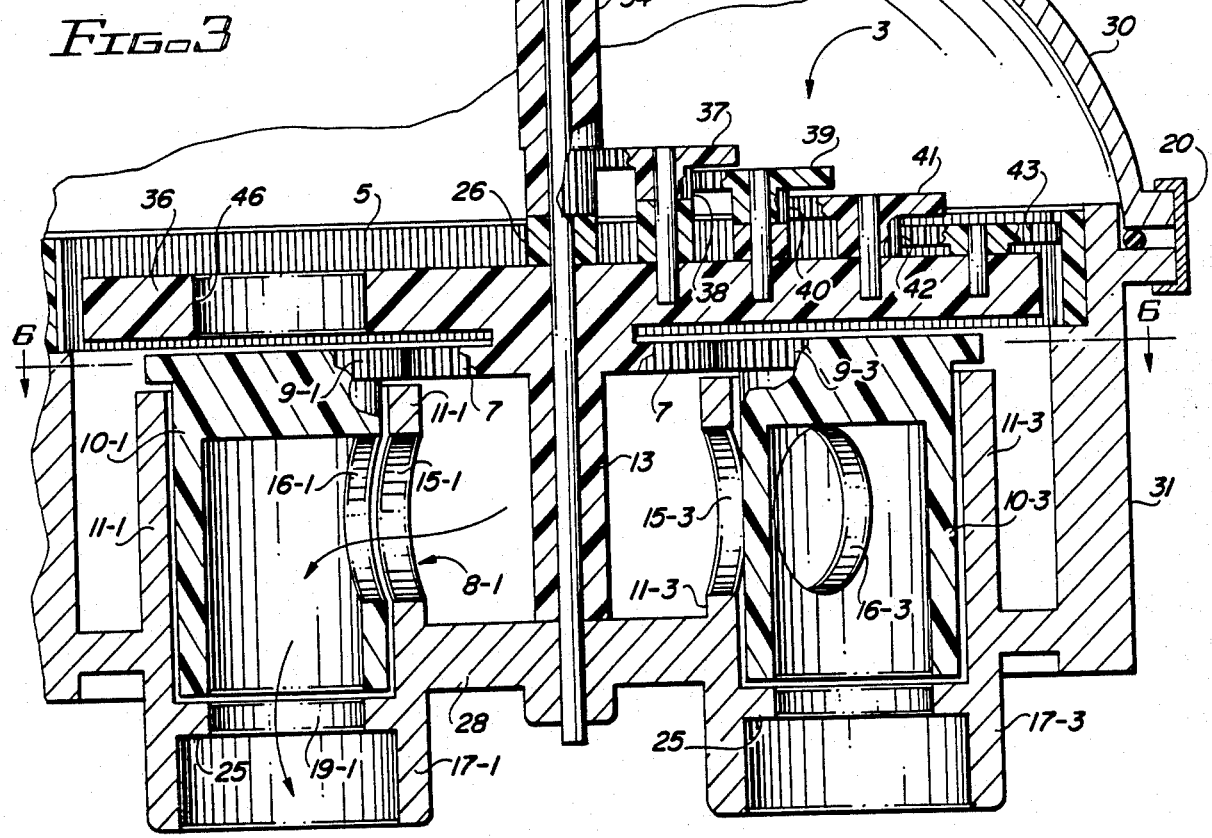
FIG. 3 is a partial section view taken along section lines 3—3 of FIGS. 2 and 6.

Rotary base 36 has a central hole through which vertical shaft 33 extends, and is supported by a sleeve bearing 13, as best seen in FIG. 3. The bottom of sleeve bearing 34 and gear 35 rest on a spacer 26 (FIG. 3) supported by the upper surface of rotary base 36.

An opening 46 in the unused portion of rotary base 36 allows flow of water from the upper section 30 into the lower section 31. Gaps between the housing and the opposed edges of rotary base 36 also allow flow of water from the upper section 30 into the lower section 31.

Referring next to FIG. 3, a large gear 7 is rigidly attached to the bottom surface of rotary base 36, and rotates concentrically therewith about vertical shaft 33. Typically, a gear reduction ratio between gear 7 and impeller 2 is about 400 to 1.

Figure 6:
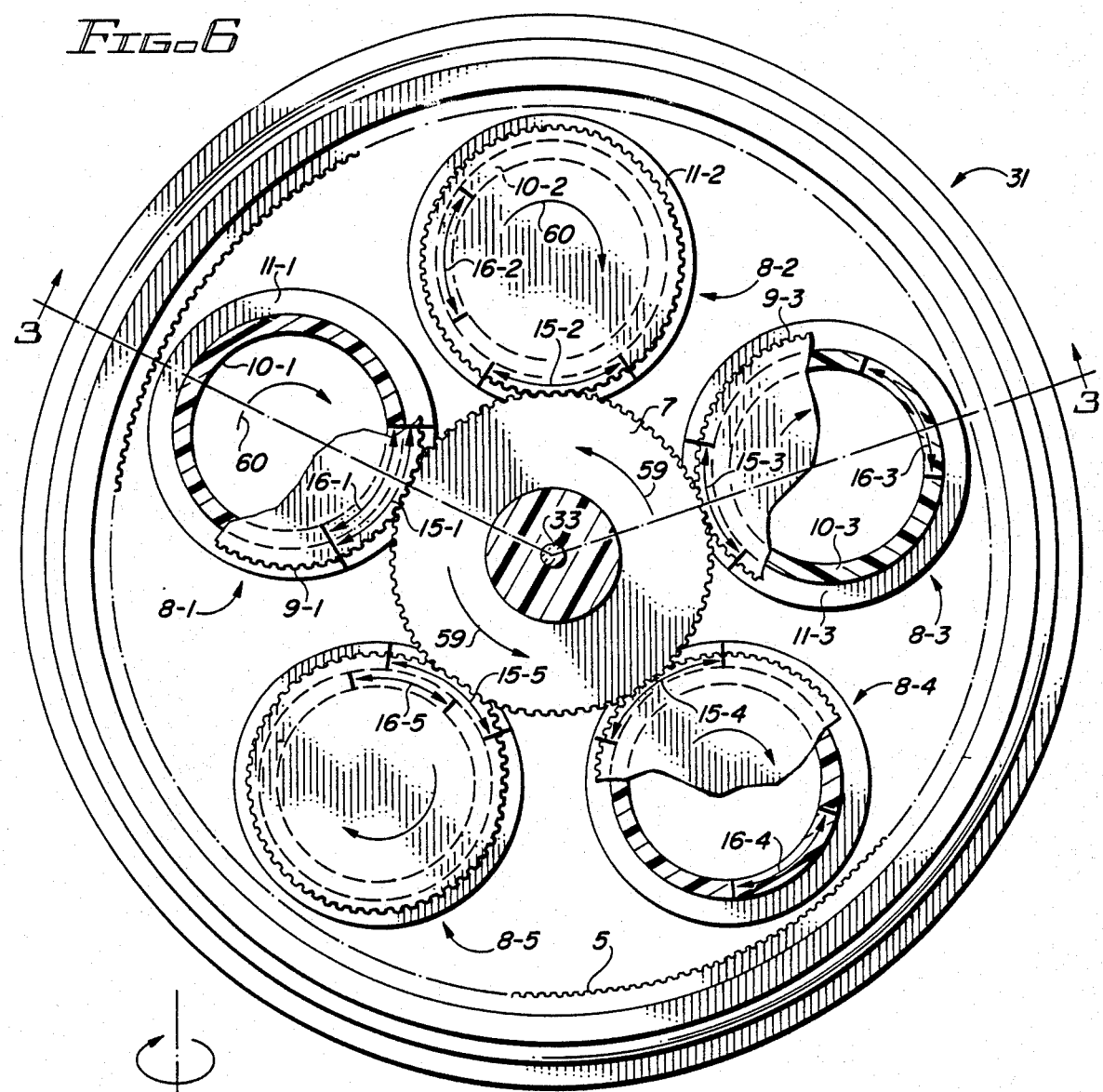
FIG. 6 is a top view of the lower section with the gear reduction and impeller assembly removed.
Figure 7:
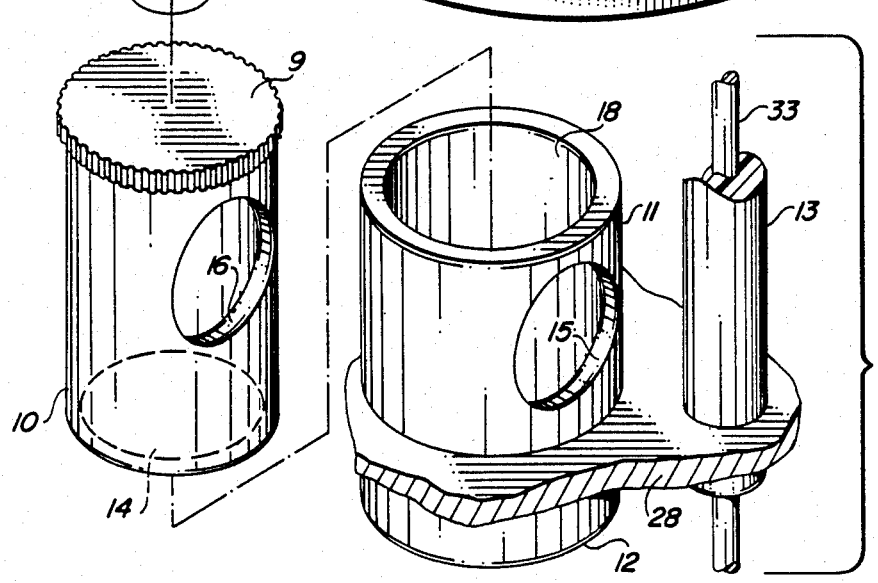
FIG. 7 is a perspective exploded view of one of the rotary cylindrical valve mechanisms shown in the top view of FIG. 6.

In accordance with the present invention, a plurality of outlet port valves 8-1, 8-2 . . . 8-5 are provided, each of which includes a respective one of stationary outer cylinders such as 11 in FIGS. 6 and 7 are attached to the bottom 28 of lower section 31. Each stationary cylinder 11 has an open top, as indicated by reference numeral 18, and a side fluid inlet port 15. At the bottom of each of stationary cylinders 11 is an annular shoulder 25 which defines an outlet opening 19, as best seen in FIG. 3. Note that in the section view of FIG. 3, only two of the outer cylinders designated by numerals 11-1 and 11-3 are shown, appearing on the left and right side of vertical post 33; the same reference numerals are used in FIG. 6.

As indicated in FIGS. 3, 5, and 6, inside each stationary cylinder 11 there is a rotary cylinder 10 which has an open bottom 14, an inlet port 16, which can be of the same size and shape of inlet port 15 of the outer cylinder 11. Each rotating cylinder 10 has a sealed top. A valve drive gear 9 is attached to the top of each of the rotary cylinders 10, providing a closed top thereto.

As best seen in FIG. 3, the elevation of the inlet port 16 is such that it can be aligned with the inlet port 15 of the stationary cylinder 11 when gear 9 is appropriately rotated. Each of the valve drive gears 9 engages the teeth of rotary base gear 7. Thus, as impeller 2 rotates, rotary base 5 rotates, causing gear 7 to rotate at the same rate, thereby causing each of the rotary cylinders 10 to rotate, sequentially opening and closing the five valves 8-1, 8-2, etc., each of which is now seen to be composed of a ported outer stationary cylinder 11 and a ported rotary cylinder 10 therein. In FIG. 6, the arrows 15 designate the relative positions of the inlet openings of the various stationary outer cylinders 11, and the arrows 16 designate the instantaneous locations of the inlet openings 16 of the various rotary cylinders 10. Thus, in the drawings valve 8-1 is completely open, because its inlet ports 15 and 16 are perfectly aligned. Inlet ports 15 and 16 of valve 8-5 partially overlap. The remaining valves 8-2, 8-3, and 8-4 are closed, since their respective inlet and outlet ports 15 and 16 do not overlap at all. As the rotary base 36 continues to rotate counterclockwise, and gear 7 correspondingly rotates clockwise in the direction of arrows 59 in FIG. 6, the inner cylinders 10 continue to rotate clockwise, sequentially opening and closing valves 8-1 . . . 8-5. The widths of the inlet ports 15 and 16 are selected so that there is never a condition in which the ports 15 and 16 at least two of the valves 8-1, 8-2, etc., are not substantially overlapped, so that there is always a continuous flow of water from the inlet tube 1 to at least one outlet port without a substantial drop in water pressure across the valve and so that there is no substantial increase in head pressure of fluid in inlet tube 1.

Although not shown in the drawings, a low friction slip ring mechanism could be provided between rotary cylinders 10 and stationary cylinders 11 to prevent debris from getting lodged between them, if this proves to be a problem.

Thus, it can be seen that this structure reduces the amount of torque produced on the various gears in the gear reduction assembly 3 compared to that in the prior ball type distribution valves. The undesirable sharp pressure increases in head pressure in the inlet tube, and hence in the filter, pump, and plumbing of a swimming pool filter/cleaning system using the prior distribution valves are avoided. This avoids minute flexing of all the components in the system and in the housing of the distribution valve, so the long-term reliability of the entire system is increased by using the distribution valve of the present invention. Reduction of stress in the gears substantially increases their life (which is a major advantage, since ordinary pool chemicals tend to degrade the preferred plastics of which the gears are presently made). Thus, the new valve structure of the present invention should produce a substantially longer, trouble-free life of the distribution valve itself and the overall pool filtering/cleaning system. Furthermore, the reduced stress on the gear assembly over that of the prior distribution valves means that less power is robbed from the impeller to overcome such stresses, making more power available to overcome resistance caused by bits of debris that might get lodged in the gear reduction system or between a rotary cylinder 10 and a stationary cylinder 11.

Another advantage of the above described distribution valve is that the sequence of opening and closing the outlet port valves 8-1, 8-2, etc., no longer depends upon their positions relative to each other, but simply in how the various valve drive gears 9 are oriented relative to the rotary base gear 7. Thus, if, after the distribution valve has been installed in a pool cleaning system, it is desired to change the sequence in which the pool cleaning heads are actuated, one merely needs to remove the upper section 30, lift the rotary base plate 36 and the gear assembly out of the lower section 31, and reposition the drive gears 9 of the various inner cylinders 10 to change the valve actuation sequence.

The present valve structure now makes it possible to design a much larger distribution valve having, for example, ten outlet ports (instead of five as illustrated), and utilize any desired number of the outlet ports, and simply block the unused ports. (This cannot be done with prior distribution valves because blocked outlet ports would block the inlet fluid flow, resulting in large unacceptable buildups in inlet head pressure and damage to the pump motor and over-stressing of the filter and plumbing.) Also, if it is desirable to simultaneously utilize two outlet ports with the same flow rate, two or more of the outlet ports can be programmed to have exactly the same on-off cycle. Furthermore, the extremely low torque required by the new distribution valve of the present invention may open up new applications in which fluid flow must be distributed but relatively little head pressure is available.

While the invention has been described with reference to a particular embodiment thereof, those skilled in the art will be able to make various modifications to the described embodiment of the invention without departing from the true spirit and scope thereof. It is intended that all elements and steps which perform substantially the same function in substantially the same manner to achieve the same result are within the scope of the invention.

What is claimed is:

1. A fluid distribution apparatus having an inlet port for receiving fluid under pressure and also having a plurality of outlet ports through which the received fluid is sequentially expelled under pressure, the fluid distribution apparatus comprising in combination:
   (a) a housing having inlet port and the plurality of outlet ports therein, the housing bounding an interior chamber, the inlet port directing flow of said fluid downward into the chamber;
   (b) a rotary impeller disposed beneath the inlet port in the chamber, said impeller having a first gear attached rigidly thereto;
   (c) a planetary gear attached in stationary relationship to the housing in the interior chamber;
   (d) gear reduction means having a second gear for meshing with the first gear and a third gear responsive to rotation of the second gear in geared-down relationship thereto for meshing with the planetary gear, the gear reduction means being supported on a rotary base, the rotary base rotating in geared-down relationship to the impeller in response to rotation of the impeller;
   (e) a fourth gear rotating in response to rotation of the rotary base;
   (f) a plurality of outlet port valves in the interior chamber each including
      i. a hollow stationary cylinder having an open top and a bottom opening into a respective one of the outlet ports, the stationary cylinder having in its cylindrical wall a fluid inlet opening,
      ii. a hollow rotary cylinder rotatably disposed in the stationary cylinder, the rotary cylinder having in its cylindrical wall a fluid inlet opening that is alignable with the fluid inlet opening of the stationary cylinder so that a corresponding outlet port is open when the fluid inlet openings of the stationary cylinder and the rotary cylinder overlap and is closed when those fluid inlet openings do not overlap, a top of each rotary cylinder being closed and a bottom thereto being open,
      iii. a plurality of drive gears attached to the rotary cylinders, respectively, and engaging the fourth gear to rotate the rotary cylinders in response to rotation of said impeller as fluid flows through the inlet port so that at all times one or two of the outlet port valves are sufficiently open that the flow of fluid through the fluid distribution apparatus is substantially unimpeded as the outlet port valves open and close and fluid pressure drop across the fluid distribution apparatus is small.

2. The fluid distribution apparatus of claim 1 wherein the fourth gear is attached in fixed relationship to the rotary base.

3. The fluid distribution apparatus of claim 2 wherein the gear reduction means is connected to a top surface of said rotary base and the fourth gear is connected to a bottom surface of the rotary base.

4. The fluid distribution apparatus of claim 3 wherein the fourth gear and the rotary base rotate about a common axis, and the valves are disposed around the common axis and each of the drive gears directly engages the fourth gear.

5. The fluid distribution apparatus of claim 1 wherein one of the outlet ports is blocked.

6. The fluid distribution apparatus of claim 1 wherein the widths of the fluid inlet openings are such that a minimum total overlapping area of the fluid inlet openings at any time exceeds a selected value.

7. A fluid distribution apparatus with a housing having an inlet port for receiving fluid under pressure and also having a plurality of outlet ports through which the received fluid is sequentially expelled under pressure, the fluid distribution apparatus comprising in combination:
   (a) a rotary impeller having a first gear attached rigidly thereto and rotating in response to fluid from the inlet port;
   (b) a gear reduction assembly connected to a rotary base and rotating the rotary base in geared-down relationship to the impeller in response to rotation of the impeller;
   (c) a first gear rotating in response to rotation of the rotary base;
   (d) a plurality of outlet port valves in the interior chamber each including
      i. a hollow stationary cylinder having an open top and a bottom opening into a respective one of the outlet ports, the stationary cylinder having in its cylindrical wall a fluid inlet opening,
      ii. a hollow rotary cylinder rotatably disposed in the stationary cylinder, the rotary cylinder having in its cylindrical wall a fluid inlet opening that is alignable with the fluid inlet opening of the stationary cylinder so that a corresponding outlet port is open when the fluid inlet openings of the stationary cylinder and the rotary cylinder overlap and is closed when those fluid inlet openings do not overlap, a top of each rotary cylinder being closed and a bottom thereto being open,
      iii. a plurality of drive gears attached to the rotary cylinders, respectively, and engaging the first gear to rotate the rotary cylinders in response to rotation of said impeller as fluid flows through the inlet port so that at all times one or two of the outlet port valves are sufficiently open that the flow of fluid through the fluid distribution apparatus is substantially unimpeded as the outlet port valves open and close and fluid pressure drop across the fluid distribution apparatus is small.

8. A method of distributing fluid under pressure by using a fluid distribution apparatus with an inlet port and a plurality of outlet ports, the method comprising the steps of:
   (a) rotating an impeller in response to flow of the fluid through the inlet port;
   (b) rotating a rotary member in geared-down relationship to the impeller in response to the rotation of the impeller;
   (c) operating a plurality of outlet port valves associated with the plurality of outlet ports, respectively, by rotating a plurality of rotary cylinders in response to rotation of the rotary member, each rotary cylinder being disposed in a corresponding hollow stationary cylinder, each stationary cylinder having in its cylindrical wall a first fluid opening and also having in one end a second fluid opening, each rotary cylinder having in its cylindrical wall a first fluid opening alignable with the first fluid opening of the corresponding stationary cylinder, each rotary cylinder also having in one end a second fluid opening aligned with the second fluid opening in the corresponding rotary cylinder, each rotary cylinder also having a fluid passage between its first and second fluid openings, the rotary cylinders being rotated so that at all times one or two of the outlet port valves are sufficiently open that flow of the fluid through the fluid distribution apparatus is substantially unimpeded as the outlet port valves open and close and fluid pressure drop across the fluid distribution apparatus is small.

* * * * *